US007761088B1

(12) United States Patent
Hannan et al.

(10) Patent No.: US 7,761,088 B1
(45) Date of Patent: Jul. 20, 2010

(54) METHOD AND SYSTEM FOR MEASURING MARKET INFORMATION FOR WIRELESS TELECOMMUNICATION DEVICES

(75) Inventors: Kevin Hannan, San Mateo, CA (US); Jerome Baccelli, Berkeley, CA (US); Laura Taylor, Alameda, CA (US)

(73) Assignee: The Nielsen Company (U.S.), LLC, Schaumburg ( * ) Notice: Subject to any disclaimer, the term of this patent is extended or adjusted under 35 U.S.C. 154(b) by 720 days.

(21) Appl. No.: 11/486,498

(22) Filed: Jul. 14, 2006

(51) Int. Cl.
*H04M 3/42* (2006.01)
(52) U.S. Cl. .................................................. 455/414.1
(58) Field of Classification Search .............. 455/414.1, 455/433, 432.2, 435.2, 575.1; 379/9; 705/26–29, 705/36–37, 1, 7, 10, 14, 50
See application file for complete search history.

(56) References Cited

U.S. PATENT DOCUMENTS

| | | | |
|---|---|---|---|
| 5,661,792 | A | 8/1997 | Akinpelu et al. |
| 5,822,410 | A | 10/1998 | McCausland et al. |
| 5,903,625 | A | 5/1999 | May |
| 6,028,914 | A | 2/2000 | Lin et al. |
| 6,049,599 | A | 4/2000 | McCausland et al. |
| 6,169,896 | B1 | 1/2001 | Sant et al. |
| 6,192,115 | B1 | 2/2001 | Toy et al. |
| 6,301,471 | B1 | 10/2001 | Dahm et al. |
| 6,411,807 | B1 | 6/2002 | Amin et al. |
| 6,487,390 | B1 | 11/2002 | Virine et al. |
| 6,556,992 | B1 | 4/2003 | Barney et al. |
| 6,597,903 | B1 | 7/2003 | Dahm et al. |
| 6,625,269 | B1 | 9/2003 | Kim |
| 6,745,011 | B1 | 6/2004 | Hendrickson et al. |
| 6,751,295 | B2 | 6/2004 | McCulley et al. |

(Continued)

FOREIGN PATENT DOCUMENTS

EP       1309207       5/2003

(Continued)

OTHER PUBLICATIONS

CN Office Action issued for CN application 01816436.6, issued Dec. 9, 2005, 6 pages.

(Continued)

*Primary Examiner*—Melody Mehrpour
(74) *Attorney, Agent, or Firm*—Hanley, Flight & Zimmerman, LLC

(57) ABSTRACT

A method of measuring wireless telecommunication market information for wireless devices. The method includes selecting a panel of numbers, generating signaling messages for the selected panel, sending the generated signaling messages, receiving a response from plurality of databases and processing the received response to determine market information. In one embodiment, the response is an electronic serial number (ESN) of a wireless device. Processing the ESN may determine the manufacturer of the wireless device, the model of the wireless device and its corresponding serial number. As such; the market-share of manufacturer of the device, its corresponding market-share for a given model, and the number of unsold wireless devices may be determined. Tracking the selected panel of numbers may determine the lifespan of a device and the relationship between providers and replacing or acquiring devices. It is appreciated that identifiers other than ESN may be used (e.g., IMEI in GSM technology).

35 Claims, 9 Drawing Sheets

U.S. PATENT DOCUMENTS

| | | | |
|---|---|---|---|
| 6,754,470 | B2 | 6/2004 | Hendrickson et al. |
| 6,788,926 | B1 | 9/2004 | Frangione et al. |
| 6,832,211 | B1 * | 12/2004 | Thomas et al. ............ 705/36 R |
| 7,003,306 | B2 | 2/2006 | Henry-Labordere |
| 7,058,412 | B2 | 6/2006 | Lowe et al. |
| 7,139,246 | B2 | 11/2006 | Harris et al. |
| 7,248,862 | B2 | 7/2007 | Minborg et al. |
| 7,366,515 | B2 | 4/2008 | Zhao et al. |
| 7,369,865 | B2 | 5/2008 | Gabriel et al. |
| 7,599,681 | B2 * | 10/2009 | Link et al. .................. 455/411 |
| 2002/0016731 | A1 | 2/2002 | Kupersmit |
| 2002/0023003 | A1 | 2/2002 | Raheman |
| 2002/0069037 | A1 | 6/2002 | Hendrickson et al. |
| 2002/0086671 | A1 | 7/2002 | Amin et al. |
| 2003/0023571 | A1 | 1/2003 | Barnhill |
| 2003/0061152 | A1 | 3/2003 | De et al. |
| 2003/0064722 | A1 | 4/2003 | Frangione et al. |
| 2003/0088491 | A1 | 5/2003 | Liu et al. |
| 2003/0190015 | A1 * | 10/2003 | McCulley et al. .............. 379/9 |
| 2003/0200135 | A1 | 10/2003 | Wright |
| 2003/0229534 | A1 | 12/2003 | Frangione et al. |
| 2004/0097245 | A1 | 5/2004 | Sheth et al. |
| 2005/0043011 | A1 * | 2/2005 | Murray et al. .............. 455/405 |
| 2005/0271029 | A1 | 12/2005 | Iffland |
| 2006/0109846 | A1 | 5/2006 | Lioy et al. |
| 2006/0135161 | A1 * | 6/2006 | Jiang et al. .................. 455/436 |
| 2007/0121603 | A1 | 5/2007 | Clark, III et al. |
| 2007/0156673 | A1 | 7/2007 | Maga et al. |
| 2007/0185867 | A1 | 8/2007 | Maga et al. |
| 2008/0176535 | A1 | 7/2008 | Cai |
| 2008/0182553 | A1 | 7/2008 | Salkini et al. |
| 2008/0228557 | A1 | 9/2008 | Sepehri-Nik et al. |

FOREIGN PATENT DOCUMENTS

| | | |
|---|---|---|
| WO | 9818270 | 4/1998 |
| WO | 0039981 | 7/2000 |
| WO | 0056098 | 9/2000 |
| WO | 0219625 | 3/2002 |
| WO | 02071674 | 9/2002 |
| WO | 2007081424 | 7/2007 |
| WO | 2008112352 | 9/2008 |

OTHER PUBLICATIONS

Office Action for U.S. Appl. No. 11/527,219, issued on Dec. 15, 2008, 8 pages.
Office Action for U.S. Appl. No. 10/237,478, issued on Feb. 17, 2009, 16 pages.
Office Action for U.S. Appl. No. 10/237,478, issued on Nov. 14, 2008, 3 pages.
Office Action for U.S. Appl. No. 10/237,478, issued on Sep. 12, 2008, 19 pages.
Office Action for U.S. Appl. No. 10/237,478, issued on Jan. 4, 2008, 15 pages.
Office Action for U.S. Appl. No. 10/237,478, issued on Apr. 19, 2007, 6 pages.
Office Action for U.S. Appl. No. 10/263,782, issued on May 21, 2003, 10 pages.
EP Office Action issued for EP application 03719560.9, issued on Oct. 8, 2008, 3 pages.
CN Office Action issued for CN 03812238.3, issued on Jan. 18, 2008, 11 pages.
CA Office Action issued for CA application 2,481,203, issued on Dec. 4, 2007, 3 pages.
JP Office Action issued for JP application P2003-583001, issued on Sep. 30, 2008, 4 pages.
Vougioukas and Manos Rouincliotis, System for Basic Level Network Fault Mgmt based on the GSM Short Message Service (SMS), Proceedings of EUROCON'2001 International Conference on Trends in Communications vol. 1, 2001, 1 page.
Telephia acquires Mspect, Adding SMS Monitoring to Its Wireless Data QoS Solution, Business Wire, Nov. 13, 2001, 2 pages.
Galaxy Phones, Mobile Phones—The Basics, internet article, www.galaxyphones.co.uk/mobile_phones_basics07.asp, Mar. 2, 2006, 4 pages.
Call Delivery, internet article, www.members.tripod.com, retrieved from internet on Feb. 1, 2006, 1 page.
NPA-NXX, North American Numbering Plan, internet article, voip-info.org, retrieved from internet on May 12, 2008, 3 pages.
Wikipedia, Network Switching Subsystem, internet article, retrieved from the internet on Mar. 2, 2006, 6 pages.
International Bureau, International Search Report for PCT/US03/18070, Aug. 29, 2003, 5 pages.
United States Patent and Trademark Office, Office Action issued for U.S. Appl. No. 11/527,219, mailed on Jun. 24, 2009, 20 pages.
United States Patent and Trademark Office, "Notice of Abandonment," issued in connection with U.S. Appl. No. 11/527,219, on Jan. 8, 2010 (2 pages).
United States Patent and Trademark Office, "Final Office Action," issued in connection with U.S. Appl. No. 10/237,478, on Oct. 2, 2009 (22 pages).
European Patent Office, "Extended European Search Report," issued in connection with European Patent Application Serial No. 09012468.6, on Jan. 26, 2010 (6 pages).
QUALCOMM, "Handling SMS in BREW," Article retrieved from www.qualcomm.com, on Aug. 30, 2007 (3 pages).
PALM, Inc., "SMS Handbook," 2001 (24 pages).
Vougioukas et al., "A System for Basic-Level Network Fault Management Based on the GSM Short Message Service (SMS)," In: Proceedings of EUROCON'2001 International Conference on Trends in Communications, vol. 1, pp. 218-222 (5 pages).
European Patent Office, Communication with European Search Report for EP Application No. 09012467.8, dated Mar. 23, 2010, 7 pages.
Patent Office of the People'S Republic of China, Notification to Grant Patent Right for Invention for CN Application No. 03812238.3, issued Mar. 24, 2010, 3 pages.
Korean Intellectual Property Office, Non-Final Rejection issued for KR Application No. 10-2004-7015715, dated Nov. 10, 2009, 8 pages.
Korean Intellectual Property Office, Final Rejection issued for KR Application No.10-2004-7015715, dated Apr. 12, 2010, 6 pages.
United States Patent and Trademark Office, Office Action issued for U.S. Appl. No. 11/445,069, dated May 10, 2010, 13 pages.

* cited by examiner

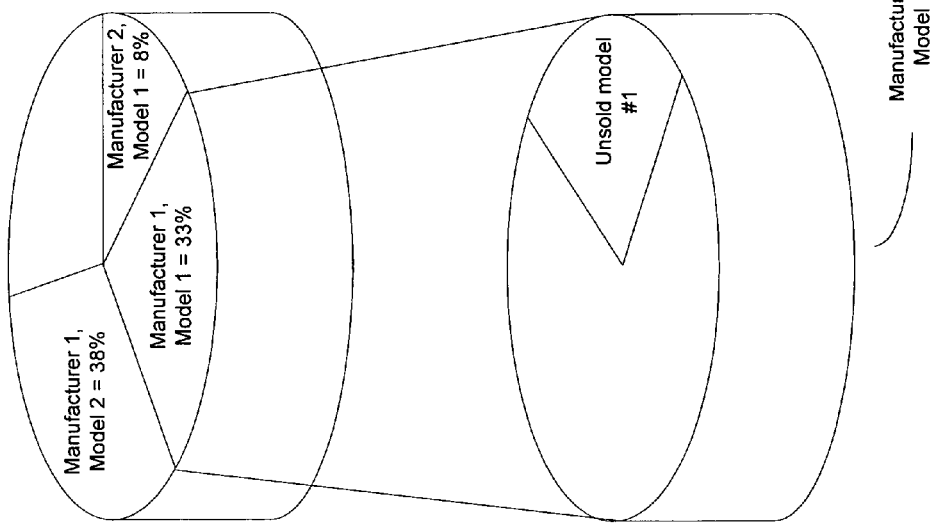
Figure 8B
Figure 8C
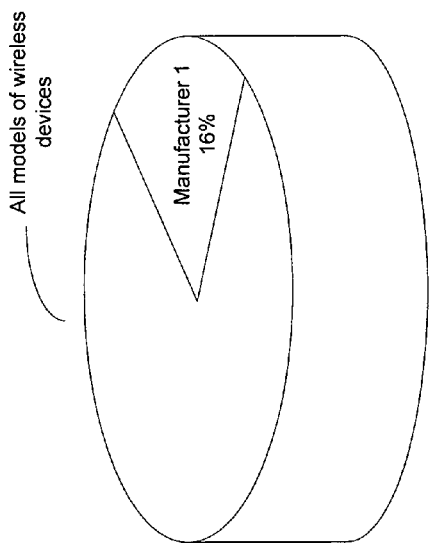
Figure 8A

METHOD AND SYSTEM FOR MEASURING MARKET INFORMATION FOR WIRELESS TELECOMMUNICATION DEVICES

RELATED U.S. PATENT APPLICATION

This Application incorporates by reference in its entirety the U.S. patent Ser. No. 11/445,069, filed on May 31, 2006, by Hannan et al., and entitled "A Method and System For Measuring Market-Share For An Entire Telecommunication Market".

BACKGROUND

1. Technical Field

The present invention relates to the field of communication systems. More particularly, embodiments of the present invention relate to a method and system for measuring market information for wireless telecommunication devices.

2. Background Art

The increasing competition in telecommunications market has increased the need for competitive performance data that includes market share information for manufacturers of wireless devices, market share information for a given model of a wireless device, and market information for the number of unsold wireless devices for a given model and a given manufacturer. Competitive performance data can be used by manufacturers of wireless devices to launch efficient marketing campaigns, to efficiently plan capital investments, or for competitive analysis, to name a few. For example, market share information for a wireless device manufacturer (e.g., cell phones, blackberries, and personal digital assistants (PDAs)) in a given geographical market is invaluable in order to effectively launch marketing campaigns or effectively plan for capital investment, to name a few.

In other words, data collection can be used by companies to better understand the structure of their respective market and as a result understand their competitive performance. Understanding competitive performance is an integral part of virtually every business structure, enabling businesses to modify their products and services accordingly to achieve their highest possible efficiency, hence making them more competitive given their available resources. Understanding competitive performance is even more important with regards to manufacturers of wireless devices given the increase in the number of service providers as well as the increase in the number of manufacturers in recent years.

In order to collect data, most telecommunication companies and manufacturers have relied mostly on surveys. Typically, a surveyor must place a call and gather data from customers directly. Other methods for gathering data have been online surveys (e.g., emailing surveys or survey through a website). As a result, most of these methods require a subscribers' participation in the process.

Unfortunately, this manual process is time consuming, expensive and prone to error. For example, customers are often confused about the model and the manufacturer of their particular wireless device, and as a result provide the wrong information (e.g., a customer may provide the name of the wireless service provider instead of the manufacturer of the wireless device). Moreover, this approach is prone to non-response from customers (e.g., ten customers may be called but only three may take the survey). This non-response leads to difficulties in making the response data representative of the population being surveyed. In addition, this approach is expensive and requires significant cost to reach sample sizes that provide accurate information. More importantly, the current approach does not allow communication companies and manufacturers of wireless devices to economically determine changes in their respective market share. For example, the current approach does not allow the manufacturers of wireless devices to measure changes in their market share for a given wireless device model. Similarly, the current approach does not allow the manufacturers of wireless devices to measure changes in their market share regardless of the wireless device model.

SUMMARY

Accordingly, a need has risen to automate the process for gathering data for competitive performance while reducing errors in data collection. Data for competitive performance includes but is not limited to, determining the model and the manufacturer of a wireless device as well as the number of unsold wireless devices for a given manufacturer. Moreover, a need has risen to collect data without involving the subscribers. Additionally, a need has risen to collect data in order to determine changes in the market share of a manufacturer for a given model of a wireless device or to determine changes in the market share of a manufacturer regardless of the model of wireless devices. It will become apparent to those skilled in the art after reading the detailed description of the present invention that the embodiments of the present invention satisfy the above mentioned needs.

In one embodiment, a market of interest is defined (e.g., geographically). When the market of interest is defined, a random panel of numbers (e.g., sample of number within the market of interest) is created. Embodiments of the present invention generate messages and initiate a call set-up or a subset of a call set-up to wireless devices. Accordingly, the system and the wireless devices respond to the generated messages. The received response is analyzed and is used to determine the market information for wireless devices. Received responses may be aggregated in order to provide market information for a defined market. It is appreciated that collecting data for the selected panel of numbers over a period of time may be used to determine changes in the market share of a manufacturer of a wireless device having a specific model and monitoring the lifecycle of the device user by understanding the duration of time the device is utilized by the consumer before upgrading or replacing and the relationship between switching service providers and devices. It is also appreciated that collecting data for the selected panel of numbers over a period of time may be used to determine changes in the market share of a manufacturer of wireless devices regardless of the model.

As a result of employing the embodiments of the present invention, the process for collecting data is automated, thereby eliminating a need for manually placing a call to a given number in order to collect data. Employing the embodiments of the present invention reduce data collection errors, since subscribers' participation is no longer needed. Embodiments of the present invention remedy non-response situations by eliminating the subscriber's participation from the process. The embodiments of the present invention determine changes in the market share for wireless device manufacturers.

One embodiment of the present invention pertains to a method of measuring wireless telecommunication market information for wireless devices, the method includes selecting a panel of numbers for sampling a wireless network; generating signaling messages for the selected panel of numbers; sending the generated signaling messages to a plurality of databases and to the selected panel of numbers; receiving at least one response from the plurality of databases and the selected panel of numbers; and processing the received response wherein the processing determines the wireless telecommunication market information for wireless devices.

Embodiments include the above and wherein the panel of numbers are selected randomly by accessing a Local Exchange Routing Guide (LERG) database. Moreover, the embodiments further include the above and wherein the generated signaling messages accesses the plurality of databases wherein the plurality of databases comprises a Home Location Register (HLR) database; a Visitor Location Register (VLR) database; and an Equipment Identity Register (EIR).

Furthermore, embodiments include the above and wherein the received response is an Electronic Serial Number (ESN) of a wireless device corresponding to a subscriber and wherein processing the received response further includes determining a corresponding manufacturer of a wireless device; determining a corresponding model of a wireless device; determining a corresponding serial number of a wireless device; and determining the number of unsold wireless devices by a given manufacturer.

BRIEF DESCRIPTION OF THE DRAWINGS

FIGS. 8A, 8B and 8C show exemplary market information in accordance with one embodiment of the present invention.

DETAILED DESCRIPTION

Figure 1:
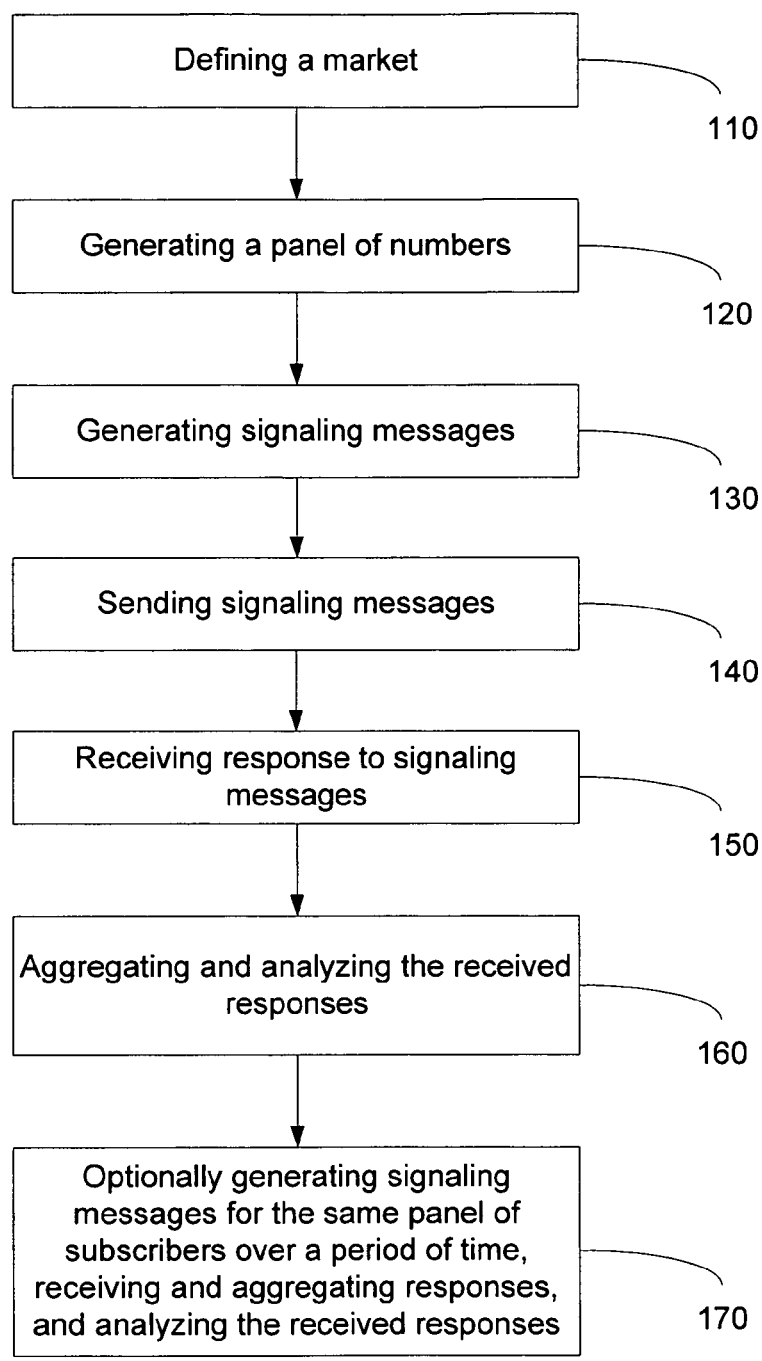
FIG. 1 shows a flow diagram of a computer implemented process for measuring market information for a telecommunication market in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternative, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A Method and System for Measuring Market Information for Wireless Telecommunication Devices Measuring market information for wireless devices include but are not limited to determining the market share of manufacturer of wireless devices and the market share for a given model of wireless devices. Moreover, measuring market information may further include determining the number of unsold wireless devices for a given manufacturer in a given market and their respective serial number and model. In addition, measuring market information may include monitoring the usage lifecycle of devices including the duration a device or device type is leveraged by the consumer before it is replaced, and the relationship between switching service providers and acquiring a new device. The market information may be used by the wireless provider or wireless manufacturer to understand their competitive performance, enabling them to modify their products and services accordingly to achieve their highest possible efficiency.

Referring now to FIG. 1, a flow diagram 100 of a computer implemented process for measuring market information for wireless telecommunication devices in accordance with one embodiment of the present invention is shown. At step 110, the market for measuring the market information is defined. The market of interest may be defined in different ways. For example, the market may be defined geographically and by the types of communication services being measured (e.g., cellular phone subscribers, blackberry subscribers or PDA subscribers). Accordingly, the market for wireless devices is a city, county, or state, to name a few, if the market is defined geographically.

For illustration purposes it is assumed that the market of interest is for cellular phones and further defined geographically. It is appreciated that defining cellular phone market geographically is by way of example and not limitation. As such, the market may be similarly defined for other wireless devices (e.g., blackberries and PDAs). In one embodiment of the present invention, a database such as Local Exchange Routing Guide (LERG) provided by Telecordia may be used in order to provide a panel of numbers for a given carrier. LERG provides carrier information and contains information for properly routing calls to specific blocks of numbers within the North American Country Code 1 calling area. LERG may provide information regarding the serving carrier for a given subscriber as well as the type of service provided. Other databases similar to LERG may be used instead (e.g., a database corresponding to LERG in Europe may be used for European subscribers).

Each provider or carrier in the United States is given a set of phone numbers which the carrier can in turn assign to individual subscribers. The first six digits of each phone number is referred to as NPA-NXX. For example NPA-NXX for 415-555-0000 is 415-555. Generally, numbers given to carriers are given in two block sizes (e.g., a block of one thousand numbers or a block of ten thousand numbers). In this example a block of ten thousand numbers is given to each carrier.

Figures 2A, 2B:
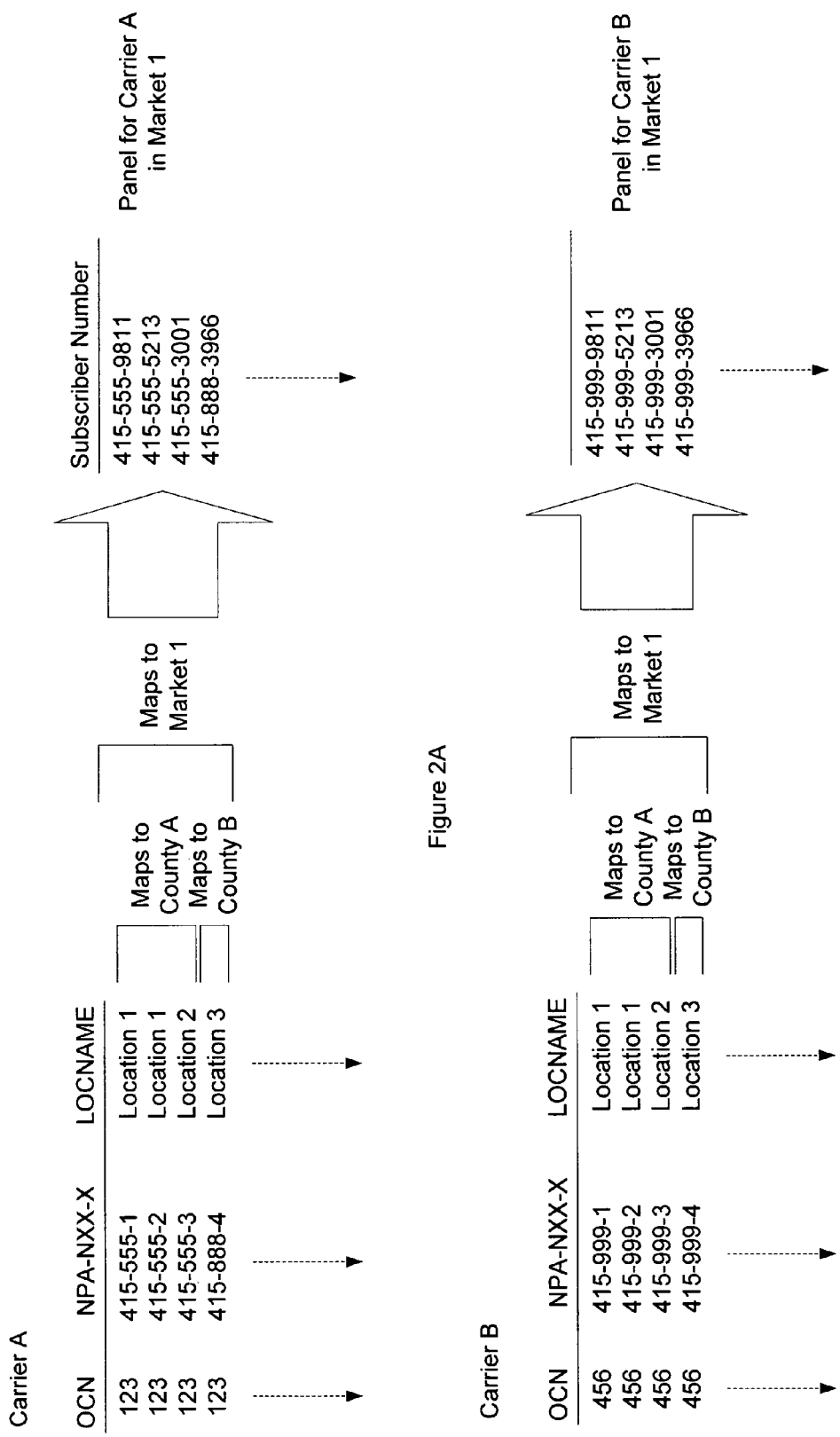
FIG. 2 shows defining and generating a panel of subscribers in accordance with one embodiment of the present invention.

Referring now to FIG. 2A, a block of ten thousand numbers is given to a carrier (e.g., Carrier A) with the Operating Carrier Number (OCN) (e.g., OCN=123) having NPA-NXX numbers of 415-555 and 415-888 with the block of ten thousand which ranges from 0000 to 9999. Therefore, Carrier A with the OCN 123 may assign ten thousand numbers, ranging from 0000-9999 for NPA-NXX number of 415-555, to individual subscribers in different locations (e.g., Location 1 and Location 2). Location 1 and Location 2 may represent County A in a given state. Similarly, Carrier A with OCN 123 may assign the next ten thousand block of numbers ranging from 0000-9999 for NPA-NXX number of 415-888 to individual subscribers in Location 3, representing County B of a given state.

Referring now to FIG. 2B, similar to FIG. 2A Carrier B with the OCN 456 has NPA-NXX number 415-999 with a block of ten thousand numbers which ranges from 0000-9999. Therefore, Carrier B with the OCN 456 may assign ten thousand numbers, ranging from 0000-9999 for NPA-NXX number of 415-999, to individual subscribers in different locations (e.g., Location 1, Location 2 and Location 3). Similarly, Location 1 and Location 2 may represent County A of a given state and Location 3 may represent County B of a given state.

Referring again to FIG. 1, at step 120 a panel of numbers for a market defined at step 110 is generated. Accordingly, LERG database may be used in order to select a panel of numbers for a given carrier, sampling the telephone network for collecting market information. For example, market information may include the market share of a manufacturer, or a market share for a manufacturer of a given model, to name a few. In one embodiment of the present invention, the panel of numbers is created by taking a random sample of numbers as defined by a market at step 110.

Alternatively, in one embodiment of the present invention at step 120 a panel of numbers for wireless subscribers is created by loading a control computer with ranges for all wireless service providers serving a market of interest (e.g., a city, country, area code or metropolitan area). The wireless service providers associated with a particular number is available from the North American Numbering Plan Association (NANPA) and the LERG. A desired sampling rate (e.g., 5%) is determined and a panel of numbers based on the sampling rate is created from the numbers provided by the NANPA and the LERG. The panel of numbers may be selected randomly, be predetermined or selected systematically. The process for creating a panel of numbers for wireless telephone numbers is described in great detail in McCulley et al. (U.S. Pat. No. 6,751,295) and is incorporated herein by reference in its entirety.

Accordingly, a panel for Carrier A and Carrier B are generated and shown in FIGS. 2A and 2B. For example, the panel of subscribers for Carrier A in market 1 comprise of subscribers 415-555-9811, 415-555-5213, 415-555-3001 and 415-888-3966 respectively. Similarly, the panel of subscribers for Carrier B in market 1 comprise of subscribers 415-999-9811, 415-999-5213, 415-999-3001 and 415-999-3966 respectively. In one embodiment, the process for defining a market of interest and generating a panel of numbers is described by and incorporates by reference in its entirety in the U.S. patent Ser. No. 11/445,069, filed on May 31, 2006, by Hannan et al., and entitled "A Method and System For Measuring Market-Share For An Entire Telecommunication Market".

Referring still to FIG. 1, at step 130 after generating a panel of numbers, signaling messages are generated based on two techniques. The two techniques include a network database technique and a signaling technique to initiate a call set-up or a subset of a call set-up for a given number within the panel of numbers created at step 120. The two techniques are described in detail and in conjunction with FIGS. 3 and 4 respectively.

At step 140, generated signaling messages are sent to the panel of numbers generated at step 120 in order to collect data. Sending the generated signaling messages causes a response by the system. At step 150, responses to the generated signaling messages are received. At step 160, the received messages are analyzed and aggregated in order to provide market information for a market defined at step 110. Optionally, at step 170 in order to keep track of changes in a given market, steps 130-160 are repeated for the same panel of numbers over a period of time. Accordingly, repeating step 130-160 over a period of time tracks changes in a given market by determining changes in the market for a given model and the changes in the market share of a given manufacturer. Moreover, tracking the generated panel of numbers at step 110 over a period of time may further be used to track the number of unsold wireless devices.

Figure 3:
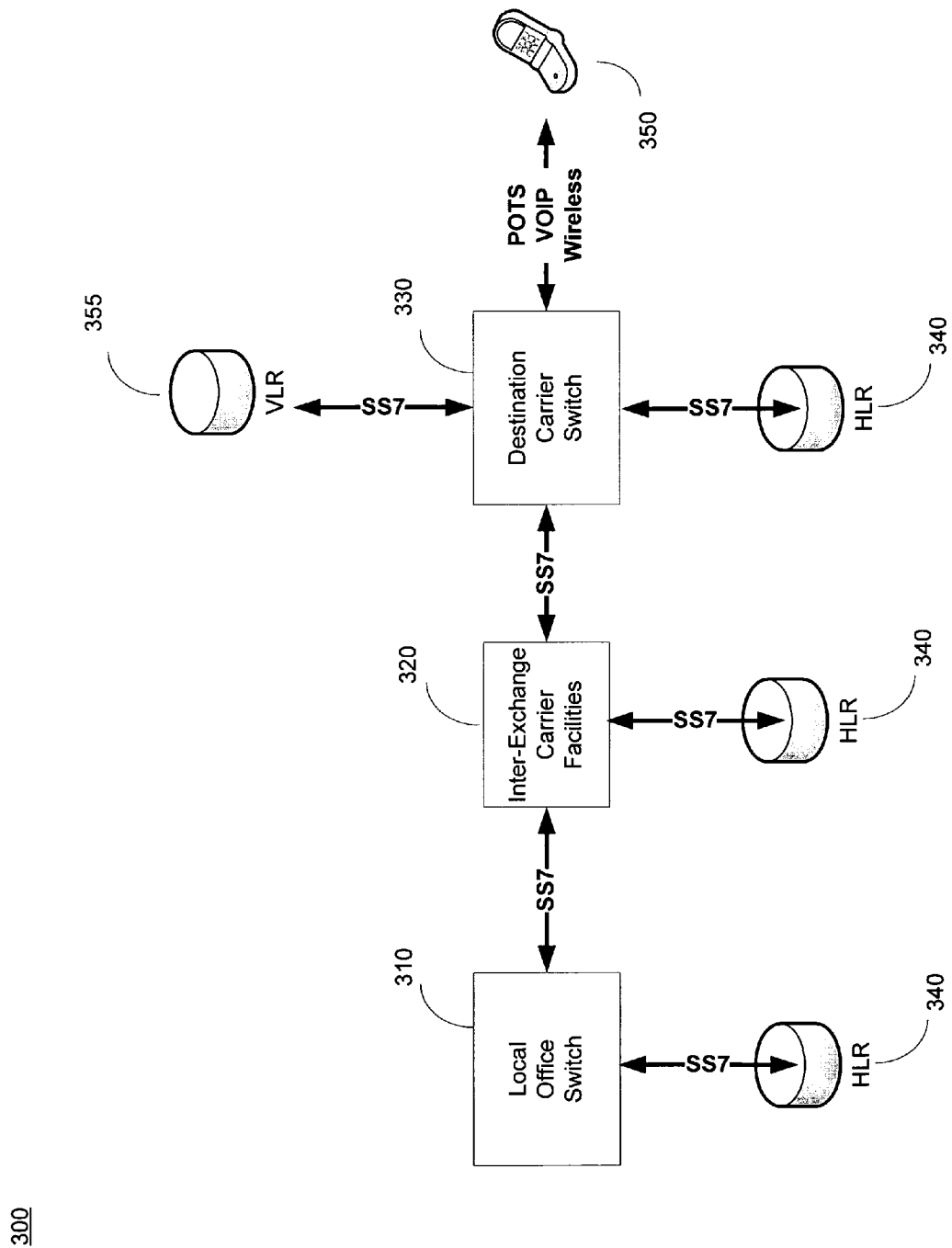
FIG. 3 shows one system embodiment for accessing a network database and initiating a call set-up to obtain market-share information in accordance with one embodiment of the present invention.

Referring now to FIG. 3, one system embodiment 300 for accessing a network database and initiating a call set-up or a subset of a call set-up for a given subscriber number to obtain market-share information in accordance with one embodiment of the present invention is shown.

A call can be separated into several phases. The first phase of a call may be a call set-up. During the call set-up, the calling party and the called party may exchange information over a signaling channel. During a second phase of a call, a channel can be seized and the exchange of information over the channel between the calling party and the called party is completed.

It is appreciated that during a call set-up, information other than the network signaling channel information required to complete a call may be exchanged. For example, during a call set-up, the billing information of a party, the routing information related to the ported status of the called number or the name of the calling party may be exchanged, to name a few. Information exchanged during a call set-up, either required in completing a call or optional in completing a call, is referred to as a subset of a call set-up throughout this document. Accordingly, a call set-up or a subset of a call set-up may be used to gather information regarding the calling party or the called party. For example, a call set-up or a subset of a call set-up can be used to determine the billing information of a party. Moreover, a call set-up or a subset of a call set-up can be used to determine whether the number of the calling/called party has been ported to another carrier. Furthermore, a call set-up or a subset of a call set-up can be used to determine the name of the calling/called party. Similarly, other aspects of a call set-up or a subset of a call set-up can be used to obtain additional information for marketing purposes such as the assignment status, the ownership of a number, determining whether a number is residential or a business number, and the electronic serial number (ESN) of a wireless device. It is appreciated that throughout this document call setup and a subset of a call setup are used interchangeably.

The system embodiment 300 shown generates and sends signaling messages and receives their corresponding responses as discussed in steps 130-150. It is appreciated that even though a cellular phone 350 is shown it is by way of example and not limitation. Accordingly, device 350 may be other telecommunication devices. For example, device 350 may be a laptop, a personal digital assistant (PDA), a blackberry, a cellular phone, or a personal computer (PC), to name a few. It is appreciated that the network database technique shown in FIG. 3 may use a communication protocol referred to as Signaling System 7 Mobile Application Part (SS7 MAP). It is appreciated that SS7 MAP and SS7 is used interchangeably throughout this document.

Circuit switched telephone networks are predominately controlled by SS7 protocol. SS7 protocol may be used in analyzing the timing and the content of the SS7 messages in order to determine the assignment status and the type of service provided for a dialed number, to name a few. It is appreciated that other protocols may be similarly used to provide additional information in determining the market information for wireless devices and their corresponding manufacturer and model.

Data collection may be initiated from a local office switch 310 (e.g., local carrier). The local office switch 310 may contain a copy of the LERG database as described above. The local office switch 310 may be coupled to a home location registry (HLR) 340.

It is appreciated that the HLR 340 may store information regarding wireless devices. For example, in one embodiment the HLR 340 may store electronic serial number (ESN) for wireless devices. ESN is a unique number assigned to each wireless device. Unique ESNs are electronically embedded into wireless devices. For example, ESN may be stored in a read only memory chip. ESN of a wireless device does not change. In general, ESN for a wireless device (e.g., a cellular phone) is a 32 bit size which gets transmitted to the base station whenever the wireless device (e.g., a cellular phone) is turned on, handed over to another cell or alternatively transmitted at regular intervals. ESN is transmitted to the base station in order for the wireless carrier to determine the validity of the call.

It is appreciated that ESN is generally used in cellular phone technology that use advance mobile phone system (AMPS), code division multiple access (CDMA) and time division multiple access (TDMA). Other technologies may use other equivalent methods for validating the call. For example, in CDMA and TDMA a 56 bit serial number called MEID may be used instead of ESN. Similarly, in global system for mobile (GSM) technology, IMEI is used instead of ESN. For example, Equipment Identity Register (EIR) register (not shown) may store IMEI information for a wireless device. Accordingly, querying the EIR may determine the market information for wireless devices and their corresponding manufacturer and model in a GSM system. As such, using ESN throughout this document is exemplary and should not be construed limiting.

Figure 4:
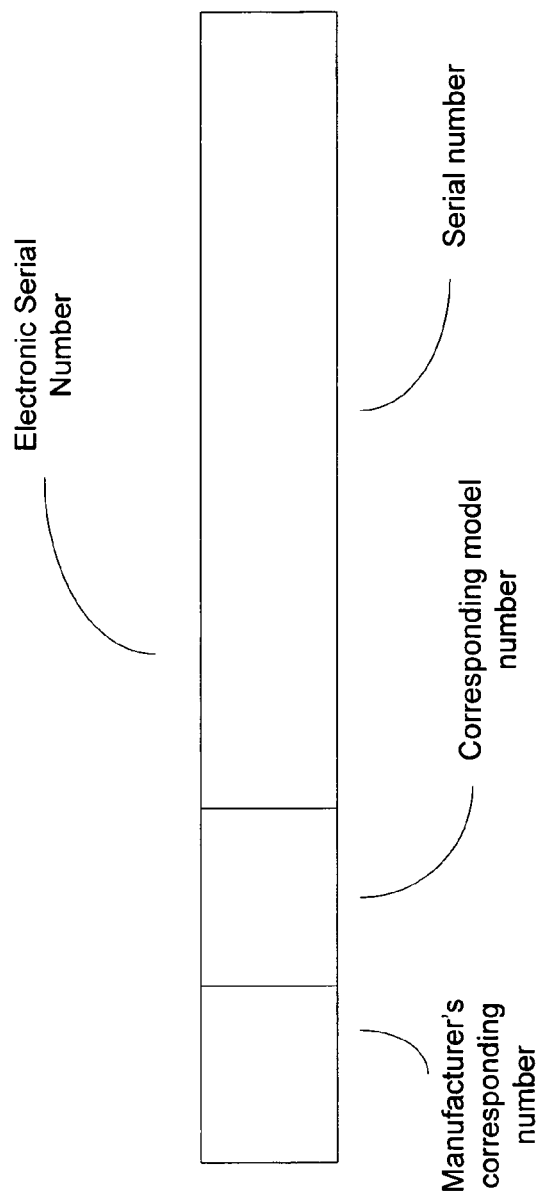
FIG. 4 shows an exemplary electronic serial number (ESN) packet in accordance with one embodiment of the present invention.

ESN of a wireless device contains information regarding the model and the manufacturer of a wireless device. Referring now to FIG. 4, an exemplary ESN in accordance with one embodiment of the present invention is shown. The first portion of an ESN may contain bits that indicate the manufacturer of a wireless device. The second portion of the ESN may contain bits that indicate the model of a wireless device. The last portion of the ESN may contain bits that correspond to the serial number of a wireless device. Accordingly, obtaining the ESN of a wireless device provides information regarding the manufacturer of the wireless device as well as the model of the wireless device. Moreover, the serial number of a wireless device may be used to determine the number of wireless devices that have been manufactured and are in use in the market defined at step 110.

The ESN of a device may also be stored by the carrier that owns the relationship with the subscriber related to the device. In general, no connection can be made between a wireless device and other devices unless the ESN transmitted by the wireless device matches the ESN stored by the local carriers. ESN stored by the local carriers may also be stored by other databases.

Referring again to FIG. 3, the local office switch 310 is coupled to an inter-exchange carrier facility 320. The inter-exchange carrier facility 320 may be carrier A or carrier B for the market defined at step 110. Moreover, the inter-exchange carrier facility 320 may be a carrier other than carrier A or B, which may be further coupled to a destination carrier switch 330. In this example, assuming that data is being collected for carrier A, the destination carrier switch 330 may be carrier A. Similarly, if the data being collected was for carrier B, the destination carrier switch 330 may be carrier B. It is appreciated that the inter-exchange carrier facility 320 may be coupled to the home location registry (HLR) 340. Accordingly, accessing the HLR 340 through the local office switch 310 or the inter-exchange carrier facility 320 may provide information regarding the ESN of the wireless device as described above.

The destination carrier switch 330 may also be coupled to a home location registry (HLR) 340. The HLR 340 may be used to store information about a wireless device or a user of a wireless device within a communication network. In one embodiment, the information stored within the HLR 340 may pertain to devices within a home service area (e.g., comprising users who are not roaming). Furthermore, the HLR 340 may store information about the wireless device 350 (e.g., location of the device, type of network signaling utilized by the device, ESN, etc.). As such, querying the HLR 340 database may determine the manufacturer, the model and the serial number of the wireless device 350 corresponding to a number within the panel of numbers generated at step 120.

The destination carrier switch 330 may also be coupled to a visitor location registry (VLR) 355. The VLR 355 may be used to store information about a roaming wireless device (e.g., not within a home service area) or a user of a roaming wireless device. In one embodiment, the information may be stored on a temporary basis (e.g., only so long as a user is roaming in a given network). For example, if the wireless device 350 is roaming, the VLR 355 may store information about the wireless device 350 (e.g., location of the device, type of network signaling utilized by the device, device identification number, ESN, etc.). Accordingly, the VLR 355 may relay information about a roaming wireless device or a user of a roaming wireless device to the HLR 340. For example, if the wireless device 350 is roaming and the HLR 340 is in the home service area for the wireless device 350, the VLR 355 may relay location information as well as the corresponding ESN of the wireless device 350 to the HLR 340. As such, querying the VLR 355 database may determine the manufacturer, the model and the serial number of the wireless device 350 corresponding to a number within the panel of numbers generated at step 120.

Referring still to FIG. 3, the destination carrier switch 330 may also be coupled to the cellular phone subscriber 350. In this example, the subscriber 350 is a cellular phone subscriber. However, use of cellular phone 350 is exemplary and not limiting. Therefore, other wireless devices may be used (e.g., a cellular phone subscriber, blackberry subscriber, PDA subscriber, laptop user, or a pager subscriber).

It is appreciated that the local office switch 310 and Inter-Exchange carrier facility 320 may also be coupled to the VLR 355 (not shown). As such, querying the VLR 355 through the local office switch 355 and Inter-Exchange carrier facility 320 may determine the manufacturer, the model and the serial number of the wireless device 350 corresponding to a number within the panel of numbers generated at step 120. It is also appreciated that the local office switch 310, the inter-exchange carrier facility 320 and the destination carrier switch 330 may also be coupled to EIR (not shown). Accordingly, accessing EIR may determine the market information for wireless devices and their corresponding manufacturer and model in a GSM system.

Figure 5:
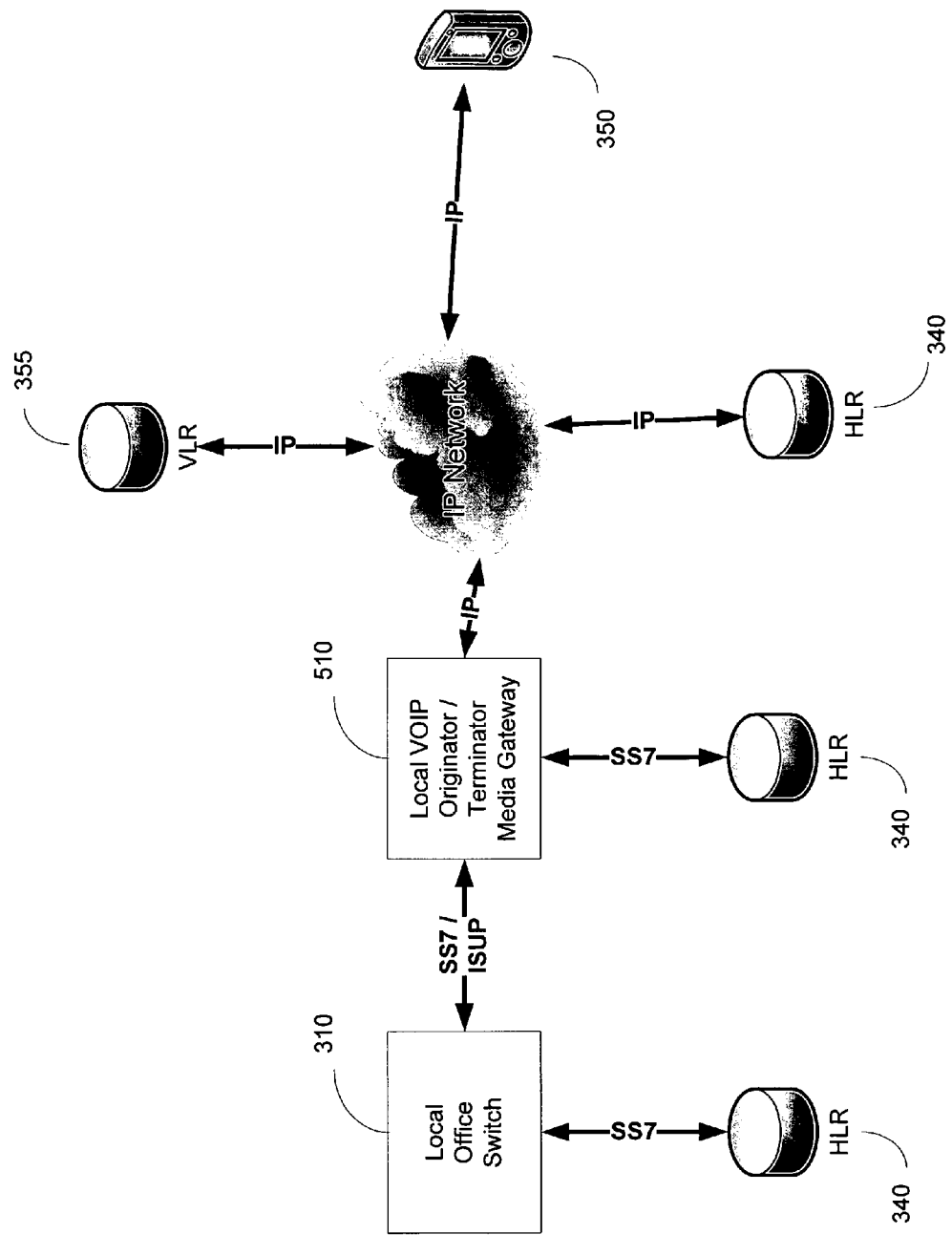
FIG. 5 shows one system embodiment for obtaining market-share information using a signaling technique in accordance with one embodiment of the present invention.

Referring now to FIG. 5, one system embodiment 500 for obtaining market information using a signaling technique in accordance with one embodiment of the present invention is shown. The system embodiment 500 shows one system embodiment for generating and sending signals and receiving their corresponding responses as discussed in steps 130-150. It is appreciated that a wireless PDA 350 shown is by way of example and not limitation. As such, device 350 may be other telecommunication devices (e.g., a laptop, personal digital assistant (PDA), blackberry, cellular phone, personal computer (PC), and pager).

Similar to before, the call may be initiated by the local office switch 310. As discussed above, the local office switch 310 may contain a copy of the LERG database as described above. The local office switch 310 may be coupled to a home location registry (HLR) 340. As such, querying the HLR 340 through the local office switch 310 may determine the manufacturer, the model and the serial number of the wireless device 350 corresponding to a number within the panel of numbers generated at step 120 as discussed above.

The local office switch 310 may be coupled to a local VOIP originator/terminator media gateway 510 using SS7/ISUP protocol. The local VOIP originator 510 transforms the inquiry from SS7/ISUP protocol to IP. The local VOIP originator 510 may be coupled to IP network which may be further coupled to the HLR 340 and VLR 355. The local VOIP originator 510 may be coupled to the HLR 340. As discussed above, querying the HLR 340 through any of the interfaces mentioned above or through any additional interface (not shown) may determine the manufacture, the model and the serial number of the wireless device 350 corresponding to a number with the panel of numbers generated at step 120.

As discussed above, querying the VLR 355 and the HLR 340 may be used to store information about the wireless device 350 or about the user of the wireless device 350 with in a communication network. Therefore, the VLR 355 and the HLR 340 may be used to store the ESN corresponding to the wireless device 350. As such, IP may be used to query the VLR 355 and the HLR 340 in order to determine the manufacturer and the model of the wireless device 350.

It is appreciated that the local office switch 310 may be further coupled to the VLR 355 (not shown). Accordingly, querying the VLR 355 through the local office switch 310 may alternatively be used to determine the manufacturer and the model of the wireless device 350 (not shown).

It is also appreciated that the local office switch 310 may also be coupled to EIR (not shown). Accordingly, accessing EIR may determine the market information for wireless devices and their corresponding manufacturer and model in a GSM system.

In one embodiment of the present invention, the two systems introduced and discussed in FIGS. 3 and 5 may be combined in order to obtain market information using the signaling technique as well as using the network database technique to obtain market information. It is appreciated that the accessing HLR and VLR can be used to determine market information (e.g., the manufacturer of a wireless device and the corresponding model of the wireless devices and etc.) is for illustration purposes and should not be construed limiting. As such, other databases and similar techniques may be used to obtain the same or similar information and are now obvious to one ordinary skilled in the art in light of the above description.

Figure 6:
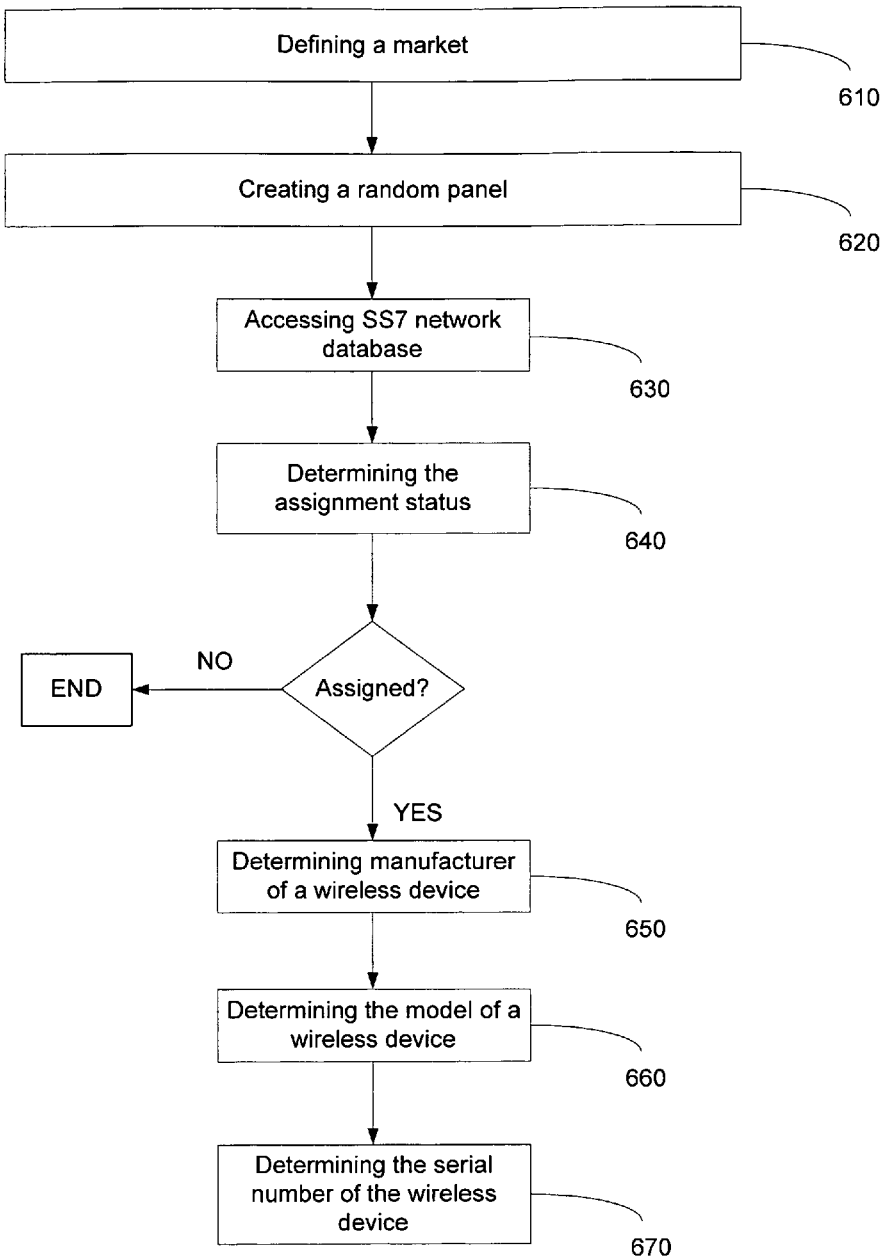
FIG. 6 shows a flow diagram of a computer implemented process for measuring market information for a telecommunication market in accordance with one embodiment of the present invention.

Referring now to FIG. 6, a flow diagram 600 for obtaining market information in accordance with one embodiment of the present invention is shown. Similar to and as discussed above, a desired market is defined at step 610 and a random panel of numbers is created at step 620. At step 630, SS7 protocol may be used to access various databases including but not limited to the VLR 355 and HLR 340. VLR 355 and HLR 340 may store information regarding the wireless device 350 by storing ESN for wireless device 350. Accordingly, querying the databases discussed above may be used to determine various marketing information including but not limited to determining the manufacturer and the model of the wireless device 350. It is also appreciated that the use of ESN is exemplary and not limiting. As such, other equivalent methods in obtaining the manufacturer, the model, and the serial number of the wireless device 350 may be employed.

In this embodiment of the present invention, if it is determined that a number is not assigned the process for gathering marketing information ends because unassigned numbers have no corresponding subscriber, thereby no corresponding wireless device. Alternatively, if it is determined that a number is assigned the process continues to step 650. It is appreciated that even though in this embodiment the process ends upon determination that a number is not assigned, in other embodiments the process may continue for other reasons. The process for determining the assignment status of a wireless device is described and incorporates by reference in its entirety the U.S. patent Ser. No. 11/445,069, filed on May 31, 2006, by Hannan et al., and entitled "A Method and System For Measuring Market-Share For An Entire Telecommunication Market".

At step 650, the ESN corresponding to the wireless device 350 is processed in order to determine the manufacturer of the wireless device 350. In general, the first 8 bits of ESN corresponds to the manufacturer of the device 350. As such, parsing the ESN obtained by querying the HLR 340 and VLR 355 discussed above and obtaining the first 8 bits may be used to determine the manufacturer of the wireless device 350. It is appreciated that the use of ESN is exemplary and not limiting. Accordingly, other embodiments may use other fields in order to determine the manufacturer of the wireless device 350. For example, in the GSM system, the IMEI may be used instead of the ESN of a wireless device. It is further appreciated that in other systems such as CDMA and TDMA systems a 56 bit serial number called MEID may be used instead of ESN in order to obtain the manufacturer of the wireless device and its corresponding model.

Referring still to FIG. 6, at step 660 the ESN corresponding to the wireless device 350 is processed in order to determine the model of the wireless device 350. In general, the second portion of ESN corresponds to the model of the wireless device 350. As such, parsing the ESN obtained by querying the HLR 340 and VLR 355 as discussed above and obtaining the second portion of the ESN may be used to determine the model of the wireless device 350. Similar to step 650, it is appreciated that the use of the ESN is exemplary and not limiting. Accordingly, other embodiments may use other fields and other queried information from the HLR 340 and VLR 355 in order to determine the model of the wireless device 350. For example, in the GSM system, the IMEI may be used instead of the ESN of a wireless device. It is further appreciated that in other systems such as CDMA and TDMA systems a 56 bit serial number called MEID may be used instead of ESN in order to obtain the manufacturer of the wireless device and its corresponding model.

At step 670, the ESN corresponding to the wireless device 350 is processed in order to determine the corresponding serial number of the wireless device 350. In general, the third portion of the ESN corresponds to the serial number of the wireless device 350. As such, parsing the ESN obtained by querying the HLR 340 and VLR 355 discussed above and obtaining the third portion of the ESN may be used to determine the serial number of the wireless number 350. The serial number of a wireless device is usually a unique number for that particular wireless device. It is appreciated that the use of the ESN is exemplary and not limiting. Accordingly, other embodiments may use other fields and other information queried from the HLR 340 and VLR 355 in order to determine the serial number of the wireless device 350. For example, in the GSM system, the IMEI may be used instead of the ESN of a wireless device. It is further appreciated that in other systems such as CDMA and TDMA systems a 56 bit serial number called MEID may be used instead of ESN in order to obtain the manufacturer of the wireless device and its corresponding model.

Figure 7:
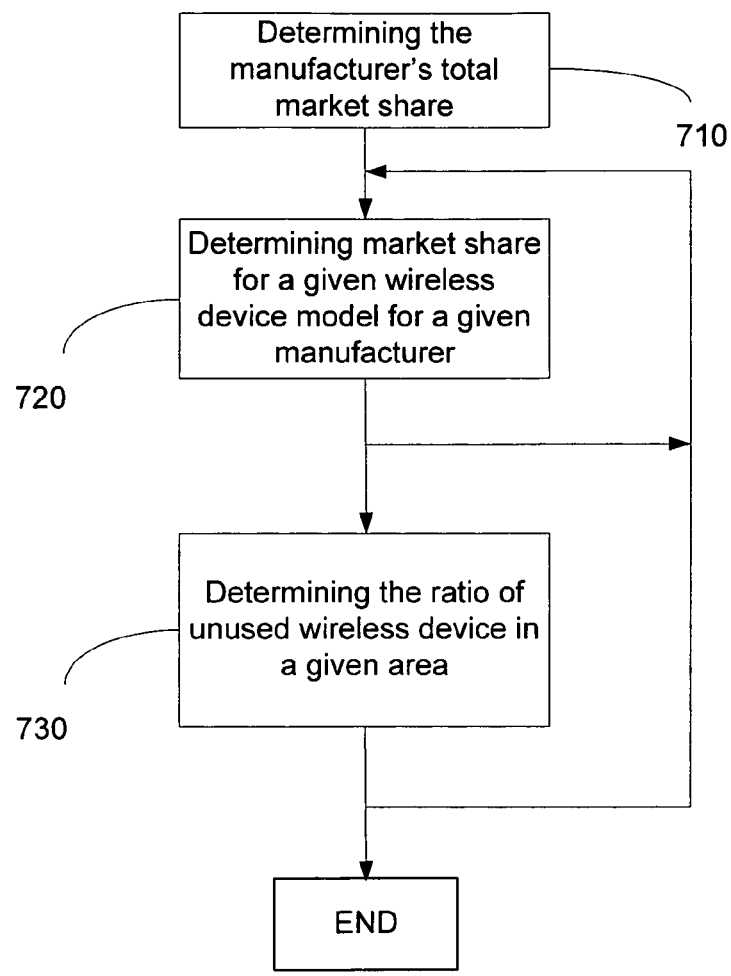
FIG. 7 shows a flow diagram of a computer implemented process for measuring market information for a telecommunication market in accordance with one embodiment of the present invention.

Referring now to FIG. 7, a flow diagram 700 for processing market information in accordance with one embodiment of the present invention is shown. At step 710, the market share for a given manufacturer (e.g., manufacturer #1) is determined. More specifically, the market information queried in the flow diagrams 100 and 600 may be used to process the manufacturer's market share. For example, the parsed ESN may be used to determine the number of wireless devices manufactured by manufacturer #1 in the given sample size (e.g., total number of subscribers in the created panel of number at step 120). Accordingly, the market share may be determined upon determining the number of wireless devices for manufacturer #1. For example, dividing the number of wireless devices for manufacturer #1 by the sample size provides the market share for manufacturer #1. This process may be repeated for each manufacturer in order to provide the complete market share information for all manufacturers present in the market defined at step 110. As such, the market share of the manufacturer (e.g., manufacturer #1) may be determined and represented as shown in FIG. 8A.

Referring still to FIG. 7, at step 720, the market share for a manufacturer (e.g., manufacturer #1) of a given model (e.g., model #1) may be determined. More specifically, the market information queried in the flow diagrams 100 and 600 may be used to determine the market share of model #1 manufactured by manufacturer #1. For example, the parsed ESN may be used to determine the number of model #1 wireless devices manufactured by manufacturer #1 in the sample size (e.g., total number of subscribers in the created panel of number in step 120). Accordingly, dividing the number of model #1 wireless devices manufactured by manufacturer #1 by the total number of wireless devices provides the market share of model #1 wireless devices manufactured by manufacturer #1. It is appreciated that the process may be repeated for all models and all manufacturers in order to determine the market share for all manufacturers and all models of wireless devices. The result of determining the market share for model #1 and model #2 wireless devices manufactured by manufacturer #1, and determining the market share for model #1 wireless devices manufactured by manufacturer #2 may be represented as shown in FIG. 8B.

At step 730, the number of unsold wireless devices in the market defined at step 110 is determined. More specifically, the market information queried in the flow diagrams 100 and 600 is used to process the serial number of wireless devices. For example, the parsed ESN may be used to determine the serial number of wireless devices which can in turn be used to determine the number of unsold model #1 wireless devices for manufacturer #1. For example, since serial numbers are in general numbered in increasing order, it may be assumed that all wireless devices with lower serial numbers than the highest serial number found for model #1 for manufacturer #1 are sold and are in use. Therefore, dividing the highest serial number found in a sample size by the highest serial number of model #1 manufactured by manufacturer #1, determines the ratio of sold wireless devices (model #1 for manufacturer #1) in the market as defined at step 110. Accordingly, the ratio of unsold wireless devices may also be obtains.

Alternatively, the number of model #1 wireless devices for manufacturer #1 may also be used to determine the number of unsold model #1 wireless devices for manufacturer #1 in the market as defined at step 110. For example, knowing the number of given models shipped to a market area, the number of model #1 wireless devices found in the sample size, and knowing the sample size of the query, the number of unsold wireless devices may be determined. For example, dividing the number of model #1 wireless devices for manufacturer #1 found in the sample size by the product of the sample size and the number of wireless devices shipped to the market as defined at step 110, provides the manufacturer's amount of sold models and in use in that market. Accordingly, the ratio of unsold wireless device for a given model may also be determined. As such, the manufacturer can allocate resources in order to avoid waste and improve sale. As such, the number of unsold models (e.g., model #1) for a given manufacturer (e.g., manufacturer #1) may be determined as shown in FIG. 8C.

It is appreciated that steps 720 and 730 may be repeated for different models and different manufacturers in order to provide total market information for all manufacturers present in the market as defined at step 110. Accordingly, utilizing the system and method described above, manufacturers of wireless devices can collect information in order to allocate resources efficiently and to launch effective marketing campaign. Moreover, using the system and method described above eliminates subscriber's participation and improves accuracy, although it is understood that market information may be combined with survey data for further analytical insights.

Figure 9:
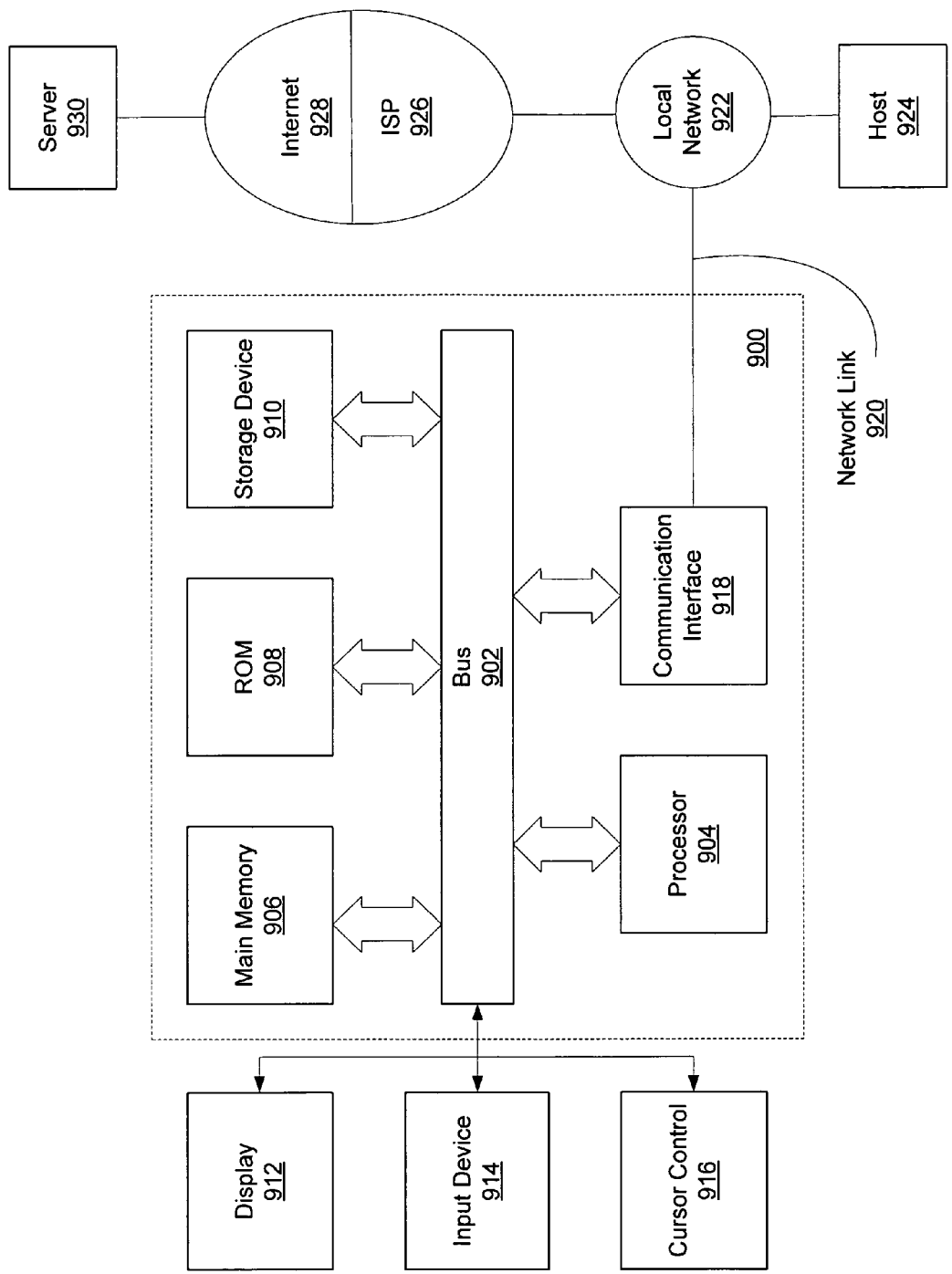
FIG. 9 illustrates a general purpose computer system that may serve as a platform for embodiments of the present invention.

FIG. 9 is a block diagram that illustrates a computer system 900 upon which an embodiment of the invention may be implemented. Computer system 900 may implement the method for measuring market information for manufacturers of wireless devices as shown in FIGS. 1-8 and includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A non-volatile storage device 910, such as a magnetic disk or optical disk, is provided and coupled to bus 902 for storing information and instructions and may store the persistent internal queue.

Computer system 900 may be coupled via bus 902 to an optional display 912, such as a cathode ray tube (CRT), for displaying information to a computer user. An optional input device 914, including alphanumeric and other keys, may be coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912.

The invention is related to the use of computer system 900 for measuring market information for manufacturers of wireless devices. According to one embodiment of the invention, the interface is used in response to processor 904 executing one or more sequences of one or more instructions contained in main memory 906 e.g., to implement process 100, 600 and 700. Such instructions may be read into main memory 906 from another computer readable medium, such as storage device 910. Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of carrier waves transporting the information.

Computer system 900 can send and receive messages through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of measuring wireless manufacturer market share for wireless devices, said method comprising:
   selecting a panel of numbers for sampling a wireless network;
   generating signaling messages for said selected panel of numbers;
   sending said generated signaling messages to at least one of a plurality of databases or to said selected panel of numbers;
   receiving a response from the at least one said plurality of databases or said selected panel of numbers, wherein the response comprises a hardcoded wireless device identifier of a wireless device;
   parsing said hardcoded wireless device identifier to obtain information indicative of a manufacturer; and
   accumulating a number of occurrences for the manufacturer to determine a market share of the manufacturer.

2. The method as described in claim 1 wherein said panel of numbers is selected by accessing a Local Exchange Routing Guide (LERG) database.

3. The method as described in claim 1 wherein said panel of numbers is selected randomly.

4. The method as described in claim 1 wherein said generated signaling messages are to access said plurality of databases, and wherein said plurality of databases comprise:
   a Home Location Register (HLR) database;
   a Visitor Location Register (VLR) database; and
   an Equipment Identity Register (EIR).

5. The method as described in claim 1 wherein parsing said hardcoded wireless device identifier further comprises obtaining a corresponding indication of a model of the wireless device.

6. The method as described in claim 1 wherein parsing said hardcoded wireless identifier further comprises obtaining a corresponding indication of a serial number of the wireless device.

7. The method as described in claim 1 wherein said market share comprises market share information for a given wireless device model in the sampled wireless network.

8. The method as described in claim 1 wherein said market share comprises a number of unsold wireless devices.

9. A computer-readable medium having program code stored thereon for causing a computer system to:
   select a panel of numbers for sampling a wireless network;
   generate signaling messages for said selected panel of numbers;
   send said generated signaling messages to at least one of a plurality of databases or to said selected panel of numbers;
   receive a response from the at least one said plurality of databases or said selected panel of numbers, wherein the response comprises a hardcoded wireless device identifier of a wireless device;
   parse said hardcoded wireless device identifier to obtain information indicative of a manufacturer; and
   accumulate a number of occurrences for the manufacturer to determine a manufacturer market share for the sampled wireless network.

10. The computer-readable medium as described in claim 9 wherein said panel of numbers is selected by accessing a Local Exchange Routing Guide (LERG) database.

11. The computer-readable medium as described in claim 9 wherein said panel of numbers is selected randomly.

12. The computer-readable medium as described in claim 9 wherein said generated signaling messages are to access said plurality of databases, and wherein said plurality of databases comprise:
   a Home Location Register (HLR) database;
   a Visitor Location Register (VLR) database; and
   an Equipment Identity Register (EIR).

13. The computer-readable medium as described in claim 9 wherein the computer system is to parse said hardcoded wireless device identifier by obtaining a corresponding indication of a model of the wireless device.

14. The computer-readable medium as described in claim 9 wherein the computer system is to parse said hardcoded wireless device identifier by obtaining a corresponding indication of a serial number of the wireless device.

15. The computer-readable medium as described in claim 9 wherein said market share comprises market share information for a given wireless device model in the sampled wireless network.

16. The computer-readable medium as described in claim 9 wherein said manufacturer market share comprises a number of unsold wireless devices.

17. A computer system comprising a processor coupled to a bus and a memory coupled to said bus, wherein said memory comprises instructions that when executed on said processor implement a method for measuring wireless market share for wireless devices, said method comprising:
   selecting a panel of numbers for sampling a wireless network;
   generating signaling messages for said selected panel of numbers;
   sending said generated signaling messages to at least one of a plurality of databases or to said selected panel of numbers;
   receiving a response from the at least one said plurality of databases or said selected panel of numbers, wherein the response comprises a hardcoded wireless device identifier of a wireless device;
   parsing said hardcoded wireless device identifier to obtain said information indicative of a manufacturer; and
   accumulating a number of occurrences for the manufacturer to determine a market share of the manufacturer.

18. The computer system as described in claim 17 wherein said panel of numbers is selected by accessing a Local Exchange Routing Guide (LERG) database.

19. The computer system as described in claim 17 wherein said panel of numbers is selected randomly.

20. The computer system as described in claim 17 wherein said generated signaling messages are to access said plurality of databases, and wherein said plurality of databases comprise:
   a Home Location Register (HLR) database;
   a Visitor Location Register (VLR) database; and
   an Equipment Identity Register (EIR).

21. The computer system as described in claim 17 wherein parsing said hardcoded wireless device identifier further comprises obtaining a corresponding indication of a model of the wireless device.

22. The computer system as described in claim 17 wherein parsing said hardcoded wireless device identifier further comprises obtaining a corresponding indication of a serial number of the wireless device.

23. The computer system as described in claim 17 wherein said market share comprises market share information for a given wireless device model in the sampled wireless network.

24. The computer system as described in claim 17 wherein said market share comprises a number of unsold wireless devices.

25. A method of measuring wireless manufacturer market share for wireless devices, said method comprising:
   a) selecting a panel of numbers for sampling a wireless network;
   b) generating signaling messages for said selected panel of numbers;
   c) sending said generated signaling messages to at least one of a plurality of databases or to said selected panel of numbers;
   d) receiving a response from the at least one said plurality of databases or said selected panel of numbers, wherein the response comprises a hardcoded wireless device identifier of a wireless device;
   e) parsing said hardcoded wireless device identifier to obtain information indicative of a manufacturer;
   (f) accumulating a number of occurrences for the manufacturer to determine a manufacturer market share for the sampled wireless network; and
   g) repeating steps b) through f) for said selected panel of numbers over a period of time wherein repeating steps b) through f) determines changes to said manufacturer market share.

26. The method as described in claim 25 wherein said changes to said market share comprise derivative metrics information.

27. A computer-implemented method to identify a wireless device market share, comprising:
   selecting a plurality of telephone numbers (TNs) associated with a market of interest;
   querying a location register with each one of the plurality of TNs to identify an associated hardcoded wireless device identifier, the hardcoded wireless device identifier including an indication of a manufacturer of a wireless device; and
   accumulating the indication of the manufacturer for each one of the plurality of TNs to identify the wireless device market share associated with a plurality of manufacturers.

28. A method as defined in claim 27, wherein the market of interest comprises at least one of a zip code, a city or a geographic region.

29. A method as defined in claim 27, wherein the location register comprises at least one of a home location registry, a visitor location registry or an Inter-Exchange carrier facility.

30. A method as defined in claim 27, wherein the hardcoded wireless device identifier comprises at least one of an electronic serial number, a mobile equipment identifier, an international mobile equipment identity number or an equipment identity register number.

31. A method as defined in claim 1, wherein the hardcoded wireless device identifier comprises at least one of an electronic serial number, a mobile equipment identifier, an international mobile equipment identity number or an equipment identity register number.

32. A method as defined in claim 1, further comprising dividing a plurality of accumulated values of occurrences for each manufacturer by a plurality of responses from the sampled wireless network to determine the market share for each manufacturer.

33. A computer-readable medium as defined in claim 9, wherein the hardcoded wireless device identifier comprises at least one of an electronic serial number, a mobile equipment identifier, an international mobile equipment identity number or an equipment identity register number.

34. A computer system as defined in claim 17, wherein the hardcoded wireless device identifier comprises at least one of an electronic serial number, a mobile equipment identifier, an international mobile equipment identity number or an equipment identity register number.

35. A method as defined in claim 25, wherein the hardcoded wireless device identifier comprises at least one of an electronic serial number, a mobile equipment identifier, an international mobile equipment identity number or an equipment identity register number.

* * * * *